(12) United States Patent
Fattal et al.

(10) Patent No.: US 7,598,623 B2
(45) Date of Patent: Oct. 6, 2009

(54) DISTINGUISHING BETWEEN DIFFERENT TRANSIENT CONDITIONS FOR AN ELECTRIC POWER GENERATION SYSTEM

(75) Inventors: Souren G. Fattal, Maple Grove, MN (US); Mitchell E. Peterson, Maple Grove, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 131 days.

(21) Appl. No.: 11/788,942

(22) Filed: Apr. 23, 2007

(65) Prior Publication Data
US 2008/0157591 A1 Jul. 3, 2008

Related U.S. Application Data

(60) Provisional application No. 60/877,970, filed on Dec. 29, 2006.

(51) Int. Cl.
*F02D 29/06* (2006.01)
*H02P 9/04* (2006.01)
(52) U.S. Cl. ..................................... 290/40 F
(58) Field of Classification Search ................. 290/40 F
See application file for complete search history.

(56) References Cited

U.S. PATENT DOCUMENTS

| | | | |
|---|---|---|---|
| 3,571,693 A | 3/1971 | Riaz | 322/32 |
| 4,063,162 A | 12/1977 | Lanz et al. | 324/535 |
| 4,208,693 A | 6/1980 | Dickens et al. | 361/94 |
| 4,245,182 A | 1/1981 | Aotsu et al. | 322/20 |
| 4,262,212 A | 4/1981 | Jacob et al. | 307/9.1 |
| 4,443,828 A | 4/1984 | Legrand et al. | 361/93.6 |
| 4,574,340 A | 3/1986 | Baker | 363/41 |
| 4,589,052 A | 5/1986 | Dougherty | 361/74 |
| 4,658,346 A | 4/1987 | Templeton | 363/160 |
| 4,661,769 A | 4/1987 | Girgis | 324/76.74 |
| 4,728,806 A | 3/1988 | Baker et al. | 307/43 |
| 4,835,405 A | 5/1989 | Clancey et al. | 290/1 A |
| 4,855,664 A | 8/1989 | Lane | 322/19 |
| 4,912,382 A | 3/1990 | Koenig et al. | 318/563 |
| 4,935,689 A | 6/1990 | Fujikawa et al. | 322/1 |
| 4,992,920 A | 2/1991 | Davis | 363/36 |

(Continued)

FOREIGN PATENT DOCUMENTS

| WO | WO 2005/046044 A1 | 5/2005 |
|---|---|---|
| WO | WO 2006/090111 A2 | 8/2006 |

*Primary Examiner*—Nicholas Ponomarenko
*Assistant Examiner*—Pedro J Cuevas
(74) *Attorney, Agent, or Firm*—J. Bruce Schelkopf; Krieg DeVault LLP; L. Scott Paynter (57) ABSTRACT

An electric power generation system is described can include a variable speed generator and an engine driving the generator to provide an AC electric power output. The output is monitored for different types of transient conditions. For example, electric current of the output is evaluated to identify a first type of transient condition and power factor of the output is evaluated to identify a second type of transient condition. System adjustment is made based on the condition type. In one form, the system is used to provide electricity on board a vehicle such as a motor coach, ship, or the like. In other forms, the system provides electric power to a remote building that does not have access to a public power grid or the system provides back-up power in case of power grid failure or the like.

25 Claims, 7 Drawing Sheets

U.S. PATENT DOCUMENTS

| | | | |
|---|---|---|---|
| 4,996,646 A | 2/1991 | Farrington | 700/293 |
| 5,006,781 A | 4/1991 | Schultz et al. | 322/25 |
| 5,028,804 A | 7/1991 | Lauw | 290/40 C |
| 5,029,120 A | 7/1991 | Brodeur et al. | 708/272 |
| 5,117,174 A | 5/1992 | Kessler | 322/21 |
| 5,168,208 A | 12/1992 | Schultz et al. | 322/25 |
| 5,305,185 A | 4/1994 | Samarov et al. | 361/704 |
| 5,315,229 A | 5/1994 | Markus | 322/28 |
| 5,390,068 A | 2/1995 | Schultz et al. | 361/95 |
| 5,406,495 A | 4/1995 | Hill | 702/72 |
| 5,433,175 A | 7/1995 | Hughes et al. | 123/2 |
| 5,563,802 A | 10/1996 | Plahn et al. | 700/297 |
| 5,587,647 A | 12/1996 | Bansal et al. | 322/45 |
| 5,587,917 A | 12/1996 | Elms | 702/66 |
| 5,592,021 A | 1/1997 | Meschter et al. | 257/727 |
| 5,592,393 A | 1/1997 | Yalla | 700/293 |
| 5,701,070 A | 12/1997 | Schultz | 322/37 |
| 5,784,267 A | 7/1998 | Koenig et al. | 363/43 |
| 5,890,097 A | 3/1999 | Cox | 702/67 |
| 5,909,656 A | 6/1999 | Yang | 702/77 |
| 6,037,768 A | 3/2000 | Moulder et al. | 324/225 |
| 6,038,267 A | 3/2000 | Oura et al. | 375/329 |
| 6,088,226 A | 7/2000 | Rearick | 361/704 |
| 6,144,092 A | 11/2000 | Kappes et al. | 257/718 |
| 6,173,216 B1 | 1/2001 | Vu et al. | 700/294 |
| 6,392,371 B1 | 5/2002 | Cheng et al. | 318/158 |
| 6,483,708 B2 | 11/2002 | Ali et al. | 361/719 |
| 6,545,870 B1 | 4/2003 | Franke et al. | 361/704 |
| 6,549,410 B1 | 4/2003 | Cohen | 361/704 |
| 6,624,529 B2 * | 9/2003 | Obayashi | 290/40 C |
| 6,624,533 B1 * | 9/2003 | Swanson et al. | 307/64 |
| 6,654,250 B1 | 11/2003 | Alcoe | 361/719 |
| 6,764,785 B2 * | 7/2004 | Colborn et al. | 429/23 |
| 6,765,157 B2 | 7/2004 | Rademacher et al. | 200/1 R |
| 6,782,941 B2 | 8/2004 | Lee | 165/80.3 |
| 6,801,019 B2 | 10/2004 | Haydock et al. | 322/17 |
| 6,844,706 B2 * | 1/2005 | Pinkerton et al. | 322/29 |
| 6,965,818 B2 | 11/2005 | Koenig et al. | 701/36 |
| 6,969,922 B2 | 11/2005 | Welches et al. | 290/1 A |
| 6,972,972 B2 | 12/2005 | Duncan et al. | 363/56.01 |
| 6,979,913 B2 * | 12/2005 | Storm et al. | 290/17 |
| 6,984,897 B2 | 1/2006 | Skeist et al. | 290/44 |
| 6,986,398 B2 * | 1/2006 | Obayashi | 180/65.28 |
| 6,994,360 B2 | 2/2006 | Kuang et al. | 180/65.2 |
| 7,002,259 B2 | 2/2006 | Howes et al. | 290/40 C |
| 7,034,427 B2 | 4/2006 | Hirzel | 310/191 |
| 7,057,303 B2 * | 6/2006 | Storm et al. | 290/1 A |
| 7,102,331 B2 | 9/2006 | Walter et al. | 322/8 |
| 7,343,884 B1 * | 3/2008 | Carney et al. | 123/41.54 |
| 7,377,237 B2 * | 5/2008 | Carney et al. | 123/41.31 |
| 7,492,617 B2 * | 2/2009 | Petter et al. | 363/41 |
| 2002/0044422 A1 | 4/2002 | Bailey et al. | 361/687 |
| 2003/0107349 A1 * | 6/2003 | Haydock et al. | 322/28 |
| 2004/0057212 A1 | 3/2004 | Russell et al. | 361/704 |
| 2004/0084965 A1 | 5/2004 | Welches et al. | 307/64 |
| 2004/0124813 A1 | 7/2004 | Pinkerton et al. | 322/32 |
| 2005/0035657 A1 | 2/2005 | Brummett et al. | 307/10.1 |
| 2006/0002157 A1 * | 1/2006 | Petter et al. | 363/37 |
| 2006/0109701 A1 | 5/2006 | Morcov et al. | 363/148 |
| 2008/0002442 A1 * | 1/2008 | Petter et al. | 363/41 |
| 2008/0116695 A1 * | 5/2008 | Peterson | 290/40 C |
| 2008/0157540 A1 * | 7/2008 | Fattal | 290/40 R |
| 2008/0157591 A1 * | 7/2008 | Fattal et al. | 307/10.1 |
| 2008/0157593 A1 * | 7/2008 | Bax et al. | 307/10.1 |
| 2008/0157724 A1 * | 7/2008 | Fattal | 322/7 |
| 2009/0037142 A1 * | 2/2009 | Kates | 702/182 |

* cited by examiner

DISTINGUISHING BETWEEN DIFFERENT TRANSIENT CONDITIONS FOR AN ELECTRIC POWER GENERATION SYSTEM

CROSS-REFERENCE TO RELATED APPLICATIONS

The present application claims the benefit of U.S. Provisional Patent Application No. 60/877,970 filed on 29 Dec. 2006 which is hereby incorporated by reference in its entirety.

BACKGROUND

The present invention relates to electric power systems, and more particularly, but not exclusively, relates to management of electric power provided by a system including a variable speed generator driven by an engine and an electric energy storage device.

In many applications of electrical generator systems, steady state load demand is typically low relative to generator power capacity. In contrast, generator selection is often driven by peak power requirements, resulting in an "oversized" generator most of the time. As an alternative, in certain situations power generation systems could include an electrical energy storage device to supplement generator power during peak usage, which facilitates a reduction in generator size. Alternatively or additionally, a variable speed generator can be used that changes speed based on power demand. Systems of this kind can heighten interest in accurately recognizing and addressing electrical load changes that pose transient operating conditions. Indeed, there is an ongoing demand for further contributions in this area of technology.

SUMMARY

One embodiment of the present invention includes a unique technique involving electric power generation control. Other embodiments include unique methods, systems, devices, and apparatus involving the control of electric power generation. Further embodiments, forms, features, aspects, benefits, and advantages of the present application shall become apparent from the description and figures provided herewith.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
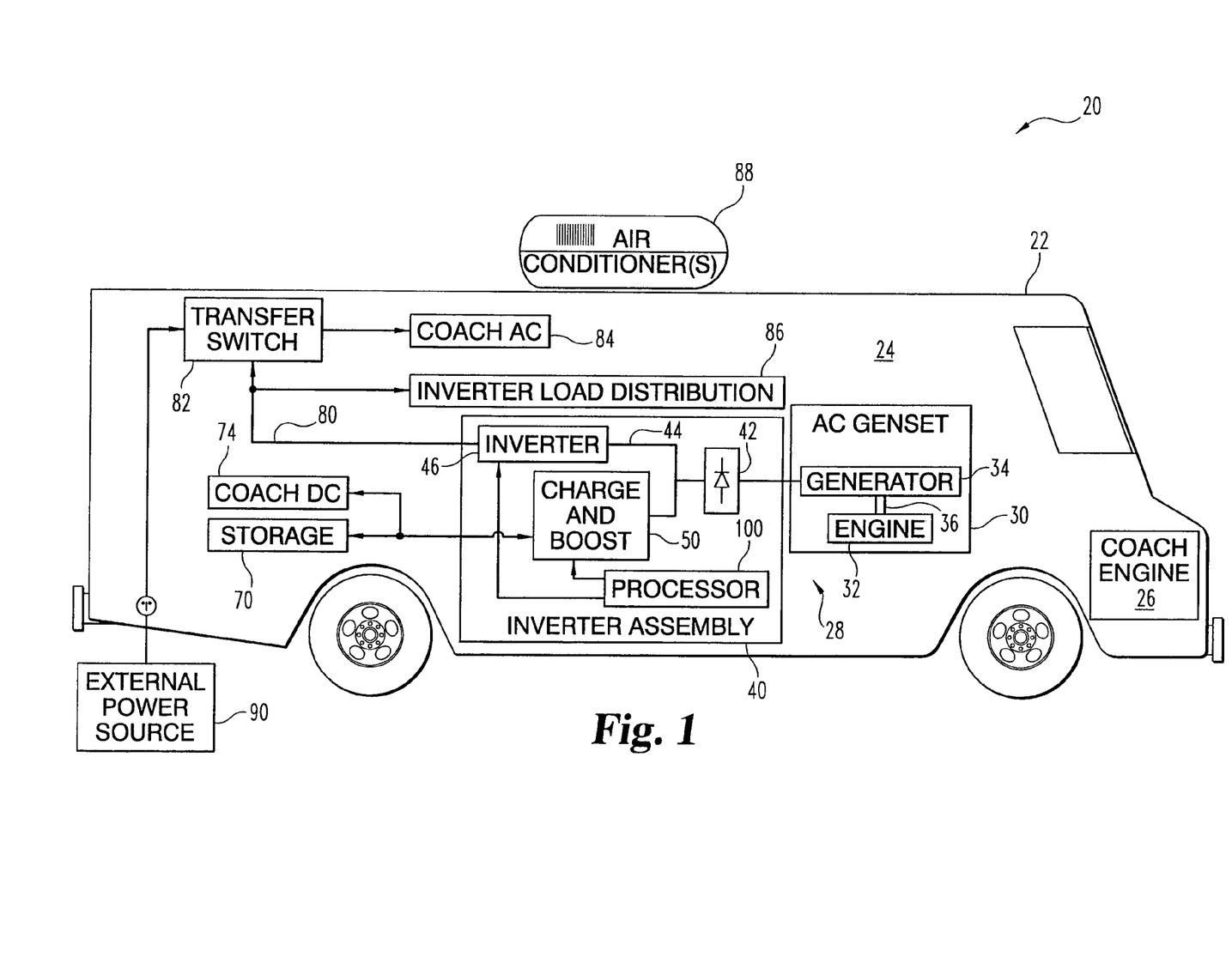
FIG. 1 is a diagrammatic view of a vehicle carrying an electric power generation system.

FIG. 1 illustrates vehicle 20 in the form of a motor coach 22. Motor coach 22 includes interior living space 24 and is propelled by coach engine 26. Coach engine 26 is typically of a reciprocating piston, internal combustion type. To complement living space 24, coach 26 carries various types of electrical equipment 27, such as one or more air conditioner(s) 88. Equipment 27 may further include lighting, kitchen appliances, entertainment devices, and/or such different devices as would occur to those skilled in the art. Coach 22 carries mobile electric power generation system 28 to selectively provide electricity to equipment 27. Correspondingly, equipment 27 electrically loads system 28. In one form, various components of system 28 are distributed throughout vehicle 20—being installed in various bays and/or other dedicated spaces.

System 28 includes two primary sources of power: Alternating Current (AC) power from genset 30 and Direct Current (DC) power from electrical energy storage device 70. Genset 30 includes a dedicated engine 32 and three-phase AC generator 34. Engine 32 provides rotational mechanical power to generator 34 with rotary drive member 36. In one arrangement, engine 32 is of a reciprocating piston type that directly drives generator 34, and generator 34 is of a permanent magnet alternator (PMA) type mounted to member 36, with member 36 being in the form of a drive shaft of engine 32. In other forms, generator 34 can be mechanically coupled to engine 32 by a mechanical linkage that provides a desired turn ratio, a torque converter, a transmission, and/or a different form of rotary linking mechanism as would occur to those skilled in the art. Operation of engine 32 is regulated via an Engine Control Module (ECM) (not shown) that is in turn responsive to control signals from control and inverter assembly 40 of system 28.

The rotational operating speed of engine 32, and correspondingly rotational speed of generator 34 varies over a selected operating range in response to changes in electrical loading of system 28. Over this range, genset rotational speed increases to meet larger power demands concomitant with an increasing electrical load on system 28. Genset 30 has a steady state minimum speed at the lower extreme of this speed range corresponding to low power output and a steady state maximum speed at the upper extreme of this speed range corresponding to high power output. As the speed of genset 30 varies, its three-phase electrical output varies in terms of AC frequency and voltage.

Genset 30 is electrically coupled to assembly 40. Assembly 40 includes power control circuitry 40a to manage the electrical power generated and stored with system 28. Circuitry 40a includes three-phase rectifier 42, variable voltage DC power bus 44, DC-to-AC power inverter 46, charge and boost circuitry 50, and processor 100. Assembly 40 is coupled to storage device 70 to selectively charge it in certain operating modes and supply electrical energy from it in other operating modes via circuitry 50 as further described hereinafter. Assembly 40 provides DC electric power to the storage device one or more motor coach DC loads 74 with circuitry 50 and provides regulated AC electric power with inverter 46. AC electric loads are supplied via inverter AC output bus 80. Bus 80 is coupled to AC power transfer switch 82 of system 28. One or more coach AC electrical loads 84 are supplied via switch 82. System 28 also provides inverter load distribution 86 from bus 80 without switch 82 intervening therebetween.

As shown in FIG. 1, switch 82 is electrically coupled to external AC electrical power source 90 (shore power). It should be appreciated that shore power generally cannot be used when vehicle 20 is in motion, may not be available in some locations; and even if available, shore power is typically limited by a circuit breaker or fuse. When power from source 90 is applied, genset 30 is usually not active. Transfer switch 82 routes the shore power to service loads 84, and those supplied by inverter load distribution 86. With the supply of external AC power from source 90, assembly 40 selectively functions as one of loads 84, converting the AC shore power to a form suitable to charge storage device 70. In the following description, AC shore power should be understood to be absent unless expressly indicated to the contrary.

Assembly 40 further includes processor 100. Processor 100 executes operating logic that defines various control, management, and/or regulation functions. This operating logic may be in the form of dedicated hardware, such as a hardwired state machine, programming instructions, and/or a different form as would occur to those skilled in the art. Processor 100 may be provided as a single component, or a collection of operatively coupled components; and may be comprised of digital circuitry, analog circuitry, or a hybrid combination of both of these types. When of a multi-component form, processor 100 may have one or more components remotely located relative to the others. Processor 100 can include multiple processing units arranged to operate independently, in a pipeline processing arrangement, in a parallel processing arrangement, and/or such different arrangement as would occur to those skilled in the art. In one embodiment, processor 100 is a programmable microprocessing device of a solid-state, integrated circuit type that includes one or more processing units and memory. Processor 100 can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired communications. In one form, processor 100 includes a computer network interface to facilitate communications the using the industry standard Controller Area Network (CAN) communications among various system components and/or components not included in the depicted system, as desired.

Figure 2:
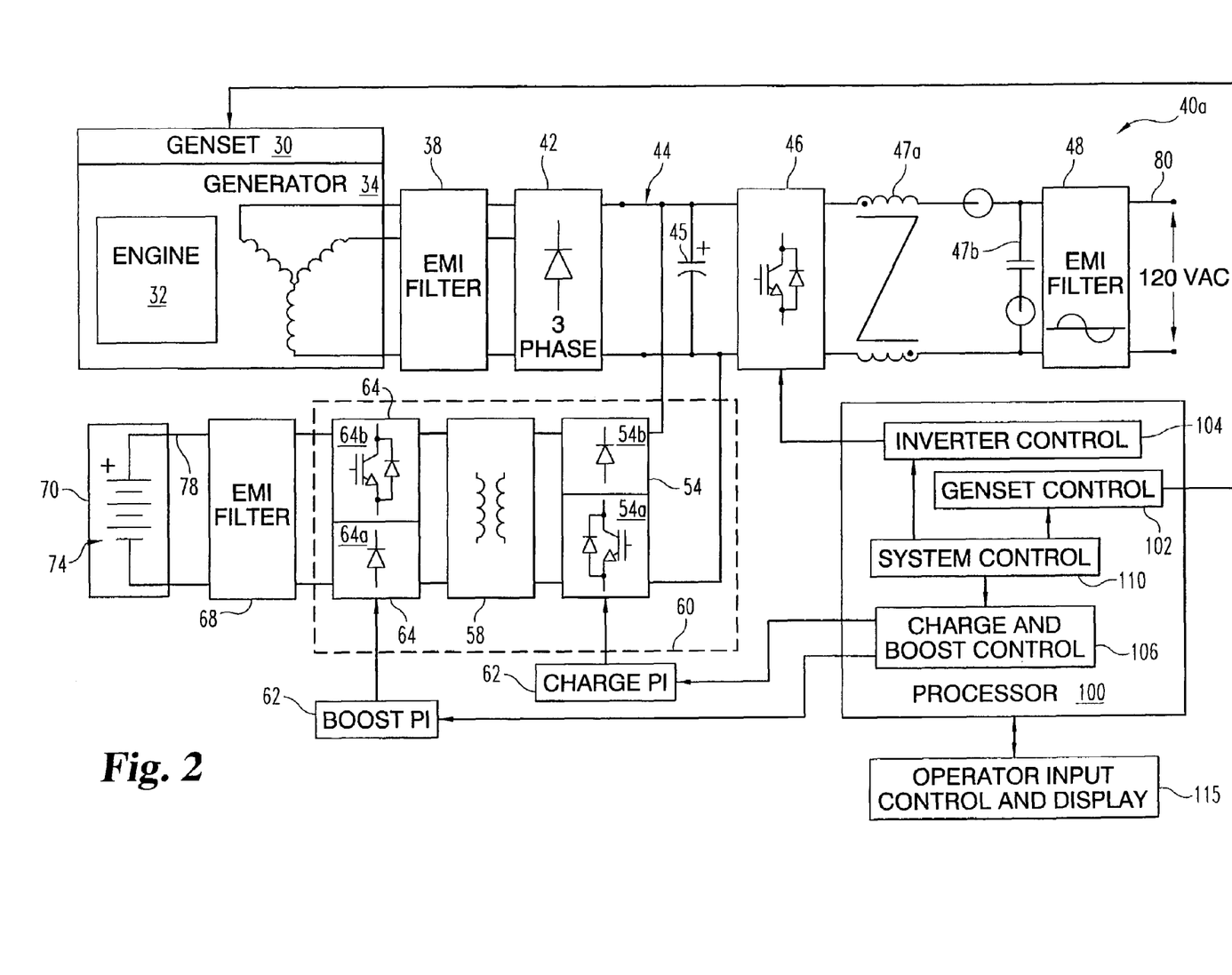
FIG. 2 is a schematic view of circuitry included in the system of FIG. 1.
Figure 3:
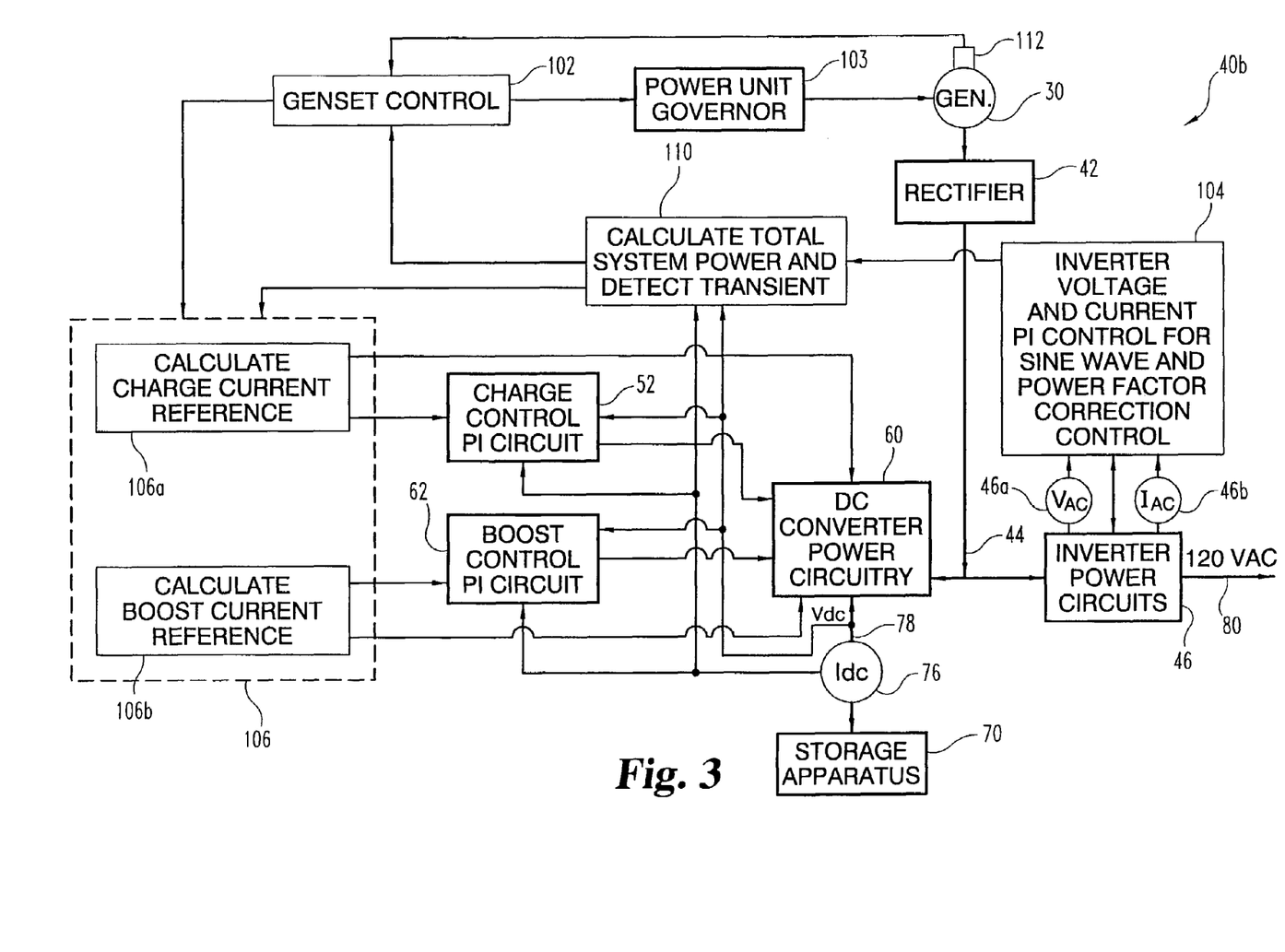
FIG. 3 is a control flow diagram for the circuitry of FIG. 2.

Referring additionally to the schematic circuit view of FIG. 2 and the control flow diagram of FIG. 3, selected aspects of system 28 are further illustrated; where like reference numerals refer to like features previously described. In FIG. 3, blocks formed with heavier line weighting correspond to hardware-implemented functionality, and blocks formed with lighter line weighting correspond to software-implemented functionality provided by programming of processor 100. Assembly 40 includes Electromagnetic Interference (EMI) filter 38 coupled to three-phase rectifier 42. In one form, rectifier 42 is implemented with a standard six diode configuration applicable to three-phase AC-to-DC conversion. Rectifier 42 receives the EMI-filtered, three-phase AC electric power output from genset 30 when genset 30 is operational. Filter 38 removes certain time varying characteristics from the genset output that may result in undesirable inference and rectifier 42 converts the filtered three-phase AC electric power from genset 30 to a corresponding DC voltage on bus 44.

At least one capacitor 45 is coupled across DC bus 44 to reduce residual "ripple" and/or other time varying components. The DC voltage on bus 44 is converted to an AC voltage by inverter 46 in response to inverter control logic 104 of processor 100. In one form, inverter 46 is of a standard H-bridge configuration with four Insulated Gate Bipolar Transistors (IGBTs) that is controlled by Pulse Width Modulated (PWM) signals from processor 100. In other forms, inverter 46 can be comprised of one or more other switch types such as field effect transistors (FETs), gated thyristors, silicon controlled rectifiers (SCRs), or the like. The PWM control signals from logic 104 selectively and individually drive the gates/switches of inverter 46. Typically, these control signals are input to intervening power drive circuitry coupled to inverter gates, and the control signals are isolated by opto-isolators, isolation transformers, or the like. Inverter control logic 104 includes a Proportional-Integral (PI) controller to synthesize an approximate sinusoidal AC waveform. Sensing arrangement 45 includes AC voltage sensor 46a and AC current sensor 46b. Inverter control logic 110 receives AC voltage (VAC) from voltage sensor 46a and AC current (IAC) from current sensor 46b that correspond to the power delivered to bus 80 from inverter 46. The VAC and IAC inputs to logic 104 are utilized as feedback to generate the sinusoidal waveform for the output power with a PI controller. In addition, these inputs are used to calculate power properties required to control sharing functions for the overall system determine the power factor for the sinusoidal voltage and current outputs to facilitate power factor correction via a PI controller. Control logic 110 receives AC power output information from inverter control logic 104. This information can be used to determine system power, and is used to compare with the power delivery capacity of genset 30 and device 70 to regulate certain operations described hereinafter. Furthermore, logic 110 uses this AC output information to determine whether a transient power condition exists that warrants consideration in such operations.

Inductor 47a and capacitor 47b provide further filtering and conversion of the inverter 46 output to a desired AC power waveform. EMI filter 48 provides interference filtering of the resulting AC power waveform to provide a regulated single-phase AC power output on bus 80. In one nonlimiting example, a nominal 120 VAC, 60 Hertz (Hz) output is provided on bus 80, the genset three-phase output to rectifier 42 varies over a voltage range of 150-250 volts AC (VAC) and a frequency range of 200-400 Hertz (Hz), and the variable voltage on DC bus 44 is between 200 and 300 volts DC (Vdc)

In addition to inverter control logic 104, processor 100 includes genset power request control logic 102 to regulate rotational speed of genset 30 relative to system 28 operations. Logic 102 provides input signals to genset 30 that are representative of a requested target load to be powered by genset 30. Genset governor 103 of genset 30 responds to logic 102 to adjust engine rotational speed, which in turn adjusts rotational speed of generator 34. Control by logic 102 is provided in such a manner that results in different rates of genset speed change (acceleration/deceleration) depending on one or more conditions (like transients), as more fully explained in connection with FIGS. 4 and 5 hereinafter.

In one particular form, governor 103 is implemented in an Engine Control Module (ECM) included with genset 30 that communicates with processor 100 over a CAN interface. Alternatively or additionally, at least a portion of governor 103 can be included in assembly 40. Speed control logic 102 is responsive to system control logic 110 included in the operating logic of processor 100, and an engine speed feedback signal provided by engine speed sensor 112. Speed adjustment with logic 102 can arise with changes in electrical loading and/or charge or boost operations of device 70, as further described hereinafter. In turn, logic 102 provides control inputs to charge and power boost control logic 106.

Controllable DC-to-DC converter 60 is electrically coupled to DC bus 44 and electrical energy storage device 70. In FIG. 2, device 70 is more specifically illustrated in the form of electrochemical battery device 75 as shown in FIG. 2. Electrical current flow between device 70 and converter 60 is monitored with current sensor 76 and DC voltage of device 70 is monitored at node 78. In one embodiment, more than one current sensor and/or current sensor type may be used (not shown). For example, in one arrangement, one sensor may be used to monitor current of device 70 for power management purposes (such as a Hall effect sensor type), and another sensor may be used in monitoring various charging states (such as a shunt type). In other embodiments, more or fewer sensors and/or sensor types may be utilized.

Converter 60 provides for the bidirectional transfer of electrical power between DC bus 44 and device 70. Converter 60 is used to charge device 70 with power from DC bus 44, and to supplement (boost) power made available to DC bus 44 to service power demand on bus 80. Converter 60 includes DC bus interface circuitry 54 and storage interface circuitry 64 under the control of charge and power boost control logic 106. Bus interface circuitry 54 includes a charge inverter 54a and power boost rectifier 54b. Storage interface circuitry 64 includes charge rectifier 64a and power boost inverter 64b. Transformer 58 is coupled between circuitry 54 and circuitry 64. Charge inverter 54a and boost inverter 64b can be of an H-bridge type based on IGBTs, FETs (including MOSFET type), gated thyristors, SCRs, or such other suitable gates/switching devices as would occur to those skilled in the art. Further, while rectifiers 54b and 64a are each represented as being distinct from the corresponding inverter 54a or 64b, in other embodiments one or more of rectifiers 54b and 64a can be provided in the form of a full wave type comprised of the protective "free wheeling" diodes electrically coupled across the outputs of the respective inverter 54a or 64b component. For rectifier operation of this arrangement, the corresponding inverter components are held inactive to be rendered nonconductive.

Charge Proportional-Integral (PI) control circuit 52 is electrically coupled to charge inverter 54a and power boost PI control circuit 62 is electrically coupled to power boost inverter 64b. Circuits 52 and 62 each receive respective charge and boost current references 106a and 106b as inputs. Electrical current references 106a and 106b are calculated by charge and power boost control logic 106 with processor 100. These references are determined as a function of power demand, system power available, and the presence of any transient power conditions. The total system power is in turn provided as a function of the power provided by inverter 46 to bus 80 (inverter power), the power-generating capacity of genset 30, and the power output capacity of device 70. The inverter power corresponds to the AC electrical load "power demand" as indicated by the VAC voltage, IAC current, and corresponding power factor that results from electrical loading of bus 80. The genset power-generating capacity is determined with reference to genset power/load requested by logic 102. When the power demand on bus 80 can be supplied by genset 30 with surplus capacity, then this surplus can be used for charging device 70 by regulating converter 60 with PI control circuit 52; and when the power demand exceeds genset 30 capacity, supplemental power can be provided to bus 80 from device 70 by regulating converter 60 with PI control circuit 62. Various aspects of dynamic "power sharing" operations of system 28 are further described in connection with FIGS. 4 and 5 hereinafter; however, further aspects of converter 60 and its operation are first described as follows.

Converter 60 is controlled with system control logic 110 to enable/disable charge and boost operations. Under control of logic 110, the charge mode of operation and the boost mode of operation are mutually exclusive—that is they are not enabled at the same time. When charge mode is enabled, the electrochemical battery form of device 70 is charged in accordance with one of several different modes depending on its charging stage. These charging stages may be of a standard type and may be implemented in hardware, software, or a combination thereof. In one form, a three-stage approach includes bulk, absorption, and float charging. When charging, circuit 52 outputs PWM control signals that drive gates of charge inverter 54a in a standard manner. Typically, the PWM control signals are input to standard power drive circuitry (not shown) coupled to each gate input, and may be isolated therefrom by optoisolators, isolation transformers, or the like. In response to the PWM input control signals, inverter 54a converts DC power from DC bus 44 to an AC form that is provided to rectifier 64a of circuitry 64 via transformer 58. Rectifier 64a converts the AC power from transformer 58 to a suitable DC form to charge battery device 75. In one form directed to a nominal 12 Vdc output of battery device 75, transformer 58 steps down the AC voltage output by inverter 54a to a lower level suitable for charging storage device 70. For nonbattery types of devices 70, recharging/energy storage in the "charge mode" is correspondingly adapted as appropriate.

When power boost mode is enabled, boost PI control circuit 62 provides PWM control signals to boost inverter 64b to control the power delivered from device 70. The circuit 62 output is in the form of PWM control signals that drive gates of boost converter 64b in a standard manner for a transformer boost configuration. Typically, these control signals are input to power drive circuitry (not shown) with appropriate isolation if required or desired. When supplementing power provided by generator 32, a current-controlled power boosting technique is implemented with circuit 62. Circuit 62 provides proportional-integral output adjustments in response the difference between two inputs: (1) boost current reference 106b and (2) storage device 70 current detected with current sensor 76. In response, inverter 64b converts DC power from device 70 to an AC form that is provided to rectifier 54b of circuitry 54 via transformer 58. Rectifier 54b converts the AC power from transformer 58 to a suitable DC form for DC bus 44. In one form directed to a nominal 12 Vdc output of device 70, transformer 58 steps up the AC voltage output from inverter 64b, that is converted back to DC power for bus 44.

It should be appreciated that the DC voltage on DC bus 44 is variable rather than regulated. The variation in voltage on DC 44 as AC power is supplied to bus 80 extends over a wide range as the speed of genset 30 and/or the boost power from or charge power to device 70 varies. In one preferred embodiment, the lower extreme of this range is at least 75% of the upper extreme of this range while providing power to electrical loads on bus 80. In a more preferred form, the lower extreme is at least 66% of the upper extreme. In an even more preferred form, the lower extreme is at least 50% of the upper extreme.

Figure 4:
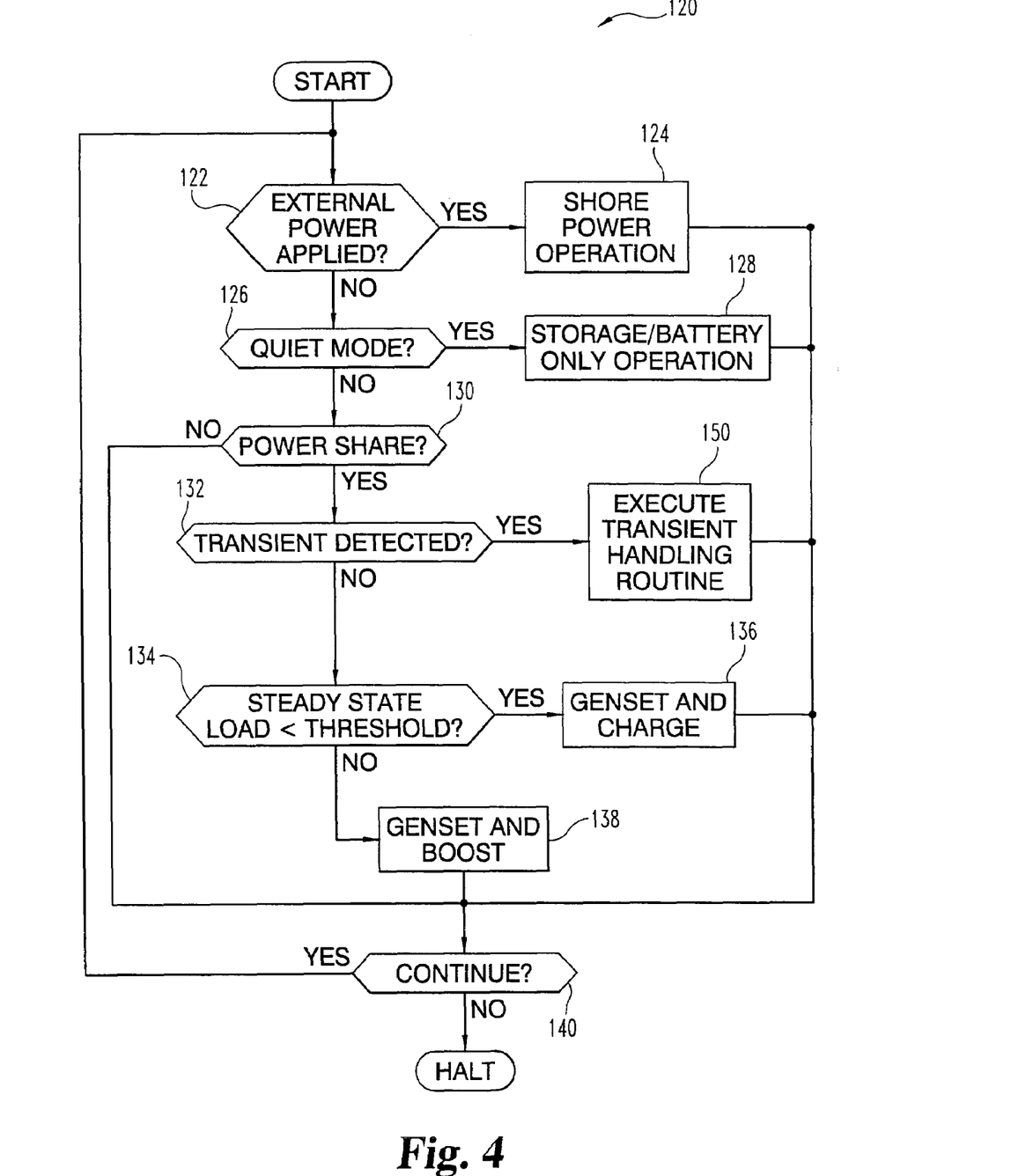
FIG. 4 is a flowchart of one procedure for operating the system of FIG. 1.

FIG. 4 depicts power management process 120 for system 28 that is performed in accordance with operating logic executed by processor 100. Also referring to FIGS. 1-3, process 120 begins with conditional 122 that tests whether shore power from external source 90 is being applied. If the test of conditional 122 is true (yes) then shore power operation 124 is performed. In operation 124, shore power is applied from bus 80 to charge apparatus 170. The AC shore power from bus 80 uses inductor 47a and circuit 46 to provide power factor correction, and is rectified through protective "free wheeling" diodes electrically coupled across each gate of inverter 46. The resulting DC voltage on bus 44 is regulated to a relatively constant value to the extent that the magnitude of the AC shore power on bus 80 remains constant. This DC voltage, as derived from shore power, is provided to converter 60 to charge battery 76. During operation 124, shore power is also provided to coach AC loads 84, to loads of inverter distribution 86 through transfer switch 82, and to coach DC loads 74.

If the test of conditional 122 is false (no), process 120 continues with conditional 126. Conditional 126 tests whether system 28 is operating in a quite mode. If the test of conditional 126 is true (yes), then the storage/battery only operation 128 is performed. Quite mode is typically utilized when the noise level resulting from the operation of genset 30 is not permitted or otherwise not desired and when shore power is not available or otherwise provided. Correspondingly, in operation 128 genset 30 is inactive, and power is provided only from storage device 70. For operation in this quiet mode, power delivered by storage device 70 is voltage-controlled rather than current-controlled, supplying a generally constant voltage to DC bus 44 to facilitate delivery of an approximately constant AC voltage on bus 80 of assembly 40. In one form, the AC power sourced from assembly 40 is only provided to loads for inverter distribution 86, with switch 82 being configured to prevent power distribution to coach AC loads 84. DC coach loads 74 are also serviced during operation 128.

Operator Input/Output (I/O) device 115 is operatively connected to processor 100 to provide various operator inputs to system 28 and output status information. In one nonlimiting form, device 115 is mounted in a cabin of coach 22 and is in communication with processor 100 in assembly 40 via CAN interfacing.

If the test of conditional 126 is false (no), then conditional 130 is encountered. Conditional 130 tests whether power share mode is active. In response to changes in electrical loading of system 28, the power share mode dynamically adjusts the speed of genset 30 and boost/charge operations based on total power capacity and transient status of system 28. It should be appreciated that total power accounts for: (a) ac power output from inverter 46 as measured by inverter voltage and current, (b) the dc power as measured at the storage device, and (c) the power loss intrinsic to inverter assembly 40. The loss calculation facilitates determination of a target genset speed and boost rate for steady state operation, as further discussed in connection with operation 138.

If the test of conditional 130 is true (yes), then conditional 132 is executed. Conditional 132 tests whether a power level change or transient has been detected. If the test of conditional 132 is true (yes), then transient handling routine 150 is performed as further described in connection with FIG. 5. Different criteria or "tests" may be used to detect different kinds of transients that are subject to conditional 132. A few examples are involved in the description of routine 150, hereinafter. If the test of conditional 132 is false (no), then the power is at steady state in the power share mode. Steady state power delivery occurs in one of two ways contingent on the steady state electrical load magnitude. Conditional 134 implements this contingency. Conditional 134 tests whether the electrical load is below a selected threshold related to available genset 30 power (steady state genset rating). This test involves adding the DC and AC power levels, accounting for losses, and comparing the total power to the genset power rating to determine if simultaneous charging of device 70 can be performed. If so, the test of conditional 134 is true (yes) and operation 136 is performed.

In operation 136, a "genset plus charge" power share mode is supported that uses excess genset capacity for charging device 70, as needed (charge enabled/boost disabled). The genset plus charge power share mode of operation 136 typically reaches steady state from a transient condition as further described in connection with routine 150. The total genset power in the genset plus charge mode is determined as the measured AC power output plus the measured DC charging power less estimated charger losses. In one form, the charger loss is estimated by reference to one or more tables containing the loss of the charger circuitry as a function of battery voltage and charge current. The target genset speed is then determined based on the normalized load. The genset speed is set to support the DC and AC loads. When the genset reaches the rated charge level, its speed may be reduced. As the AC power requirement approaches the genset rating, the charge rate may be reduced in order to maintain load support with genset 30.

If the test of conditional 134 is false (no), then operation 138 results. In operation 138, genset 30 and device 70 are both utilized to provide power to the electrical load at steady state in a "genset plus boost" power share mode. The desired boost rate is calculated based on total AC and DC power requirements less loss. This rate controls boost current to reach the desired power share between the genset and the storage device. The boost rate is calculated by determining the desired storage power contribution to the system load and referencing one or more tables that represent the loss of boost circuitry as a function of battery voltage and current.

Typically, for this steady state condition, genset 30 is operating at an upper speed limit with additional power being provided from device 70 in the boost enabled mode. It should be understood that this genset plus boost power share operation also typically reaches steady state from a transient condition as further described in connection with routine 150 as follows. In one form, the load calculations are normalized to a percent system rating, a percent boost capability and a percent genset load to facilitate system scaling for different genset and boost sizes. By way of nonlimiting example, a few representative implementations include a 7.5 kW genset and 2.5 kW boost for a total of 10 kW, a 5.5 kW genset and 2.5 kW boost for a total of 8 kW, and 12 kW genset and 3 kW boost for a total of 15 kW, and a 12 kW genset and 6 kW boost for a total of 18 kW. Naturally, in other embodiments, different configurations may be utilized.

Figure 5:
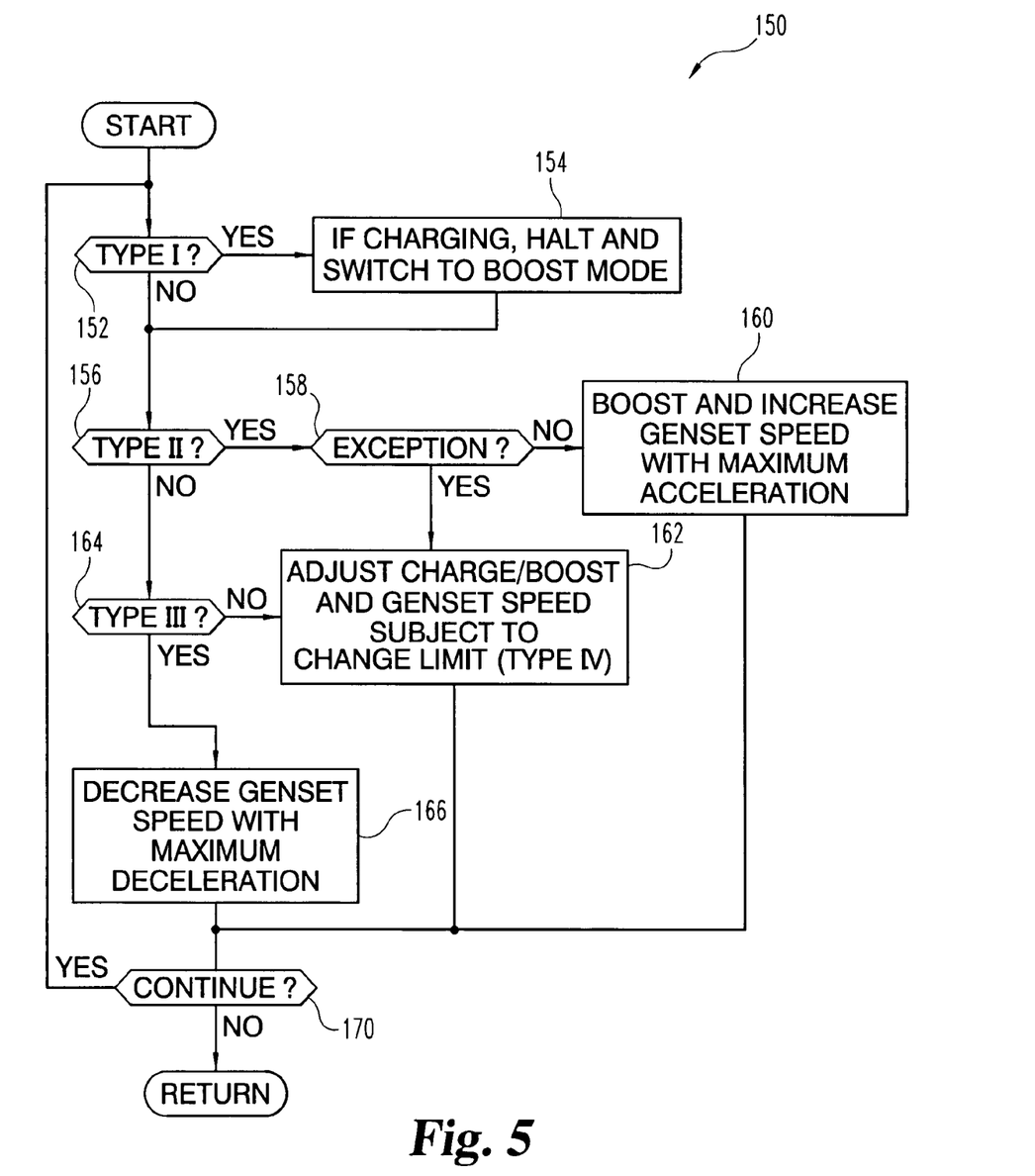
FIG. 5 is a flowchart for addressing different types of power transients with the circuitry of FIG. 2.

FIG. 5 depicts transient handling routine 150 in flowchart form. Routine 150 is executed by process 120 when conditional 132 is true (yes), which corresponds to a detected transient. As described in process 120 and routine 150, "transient" operation refers to a change in the electrical power delivered by system 28 that typically results from a change in electrical loading. In contrast, "steady state" operation refers to a generally constant load level and corresponding constant level of electrical power delivered by system 28. For purposes of clarity, process 120 and routine 150 distinguishes these modes of operation at a discrete logical level in a delineated sequence; however, it should be appreciated that implementation can be accomplished in a variety of different ways that may involve analog and/or discrete techniques with various operations performed in a different order and/or in parallel to provide dynamic shifts between steady state and transient operations in response to electrical load conditions. In one example, an affirmative outcome of conditional 132 results when any of several different detection tests are met that each correspond to a different type of transient conditions. These different transient conditions are based on changes in one or more properties of the output power relative to various criteria. Collectively, several categories of transient conditions are distinguished by routine 150, including: type I, type II, type III, and type IV transient conditions; however, it should be appreciated that this labeling is used to lend clarity to the description and is not intended to be limiting. Indeed, in other embodiments, more or fewer transient conditions may be distinguished and/or handled differently. Further, selected transients corresponding to both an increased power level ("positive" transients) and those of a decreased power level ("negative" transients) are included among these various types. It should be appreciated that more than one of these conditions may apply to a given change in electrical loading as further described hereinafter.

Routine 150 starts with conditional 152, which tests whether a type I transient condition has occurred. A type I transient condition is based on evaluation of just a fraction of an AC power cycle to provide a rapid determination regarding whether a positive transient has resulted that would make a change from a charging state to a boost state desirable. In contrast, other transient types tend to be based on analysis of longer portions of the output waveform—typically one or more cycles—and tend to result in different actions as described in greater detail in connection with the other transient types. Typically, a type I transient condition results from the most extreme type of transient power increase that occurs in a motor coach applications, such as the addition of a large reactive load like that presented by the initial current draw of motors for multiple air conditioners 88 that are activated at the same time, or when a resistive load exceeding the rating of the genset is applied; however, this kind of transient may be detected under other circumstances, too. Furthermore, for a given positive transient, the type I transient condition can apply at the same time as another transient condition, such as the type II transient condition described further hereinafter.

The detection of a type I transient condition is based on analysis of output current for a portion of the output power waveform. The type I detection approach provides for a relatively rapid transient response, disabling the charge mode for device 70 more quickly than for other transient types. On the other hand, to reduce the chances of a false indication of a type I transient condition, the change in load characteristics selected to trigger a type I transient significantly differ from those of other transient types. Further description of the other transient condition types and corresponding detection thereof appears after the description of type I transient condition detection provided in connection with FIG. 6 as follows.

Figure 6:
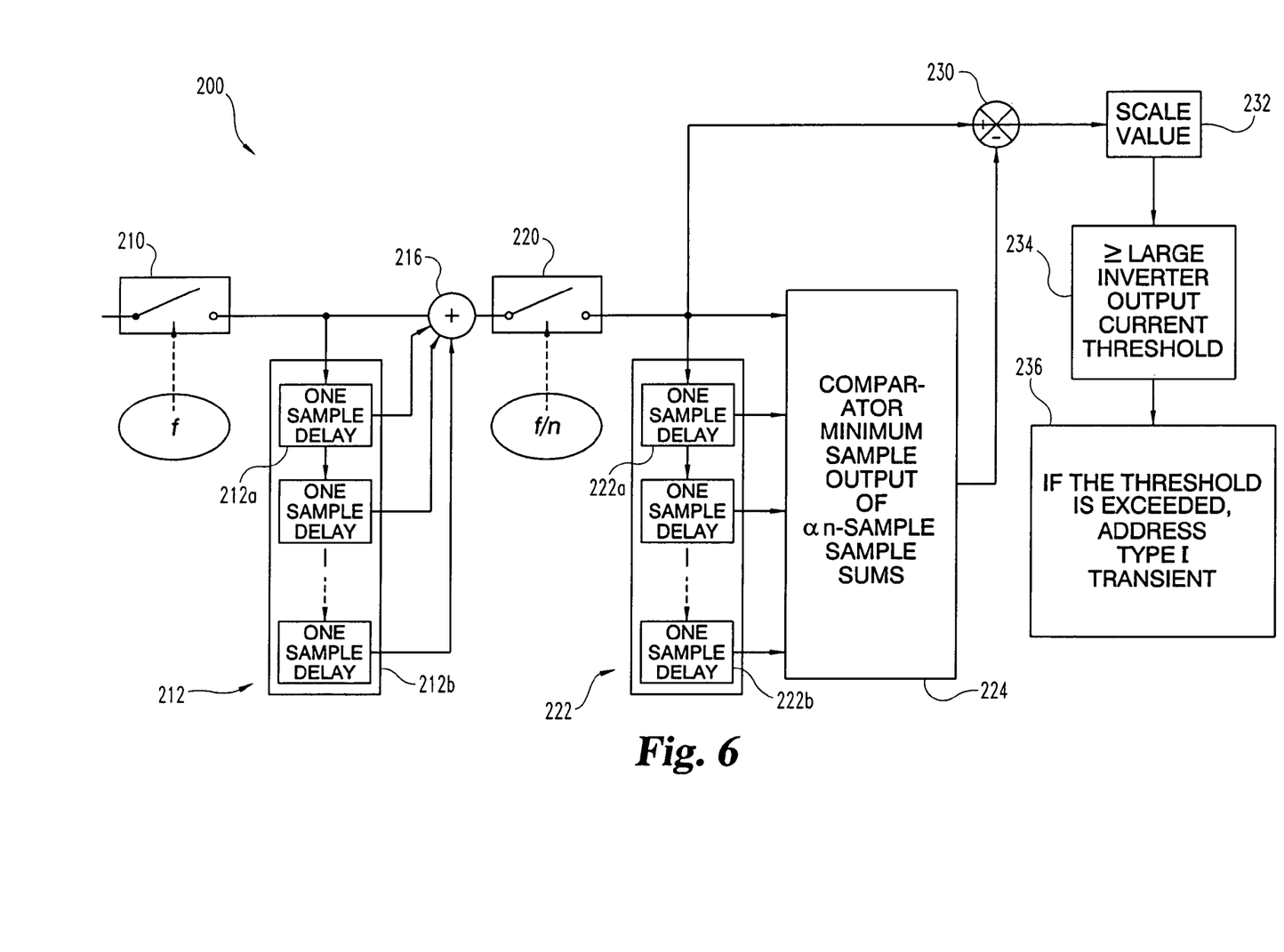
FIG. 6 is a diagram depicting operating logic for one type of large transient detection in accordance with the routine of FIG. 5.

FIG. 6 depicts operating logic 200 for detection of a type I transient condition that can be implemented with programming and/or hardware of processor 100. Per FIG. 6, logic 200 samples the inverter output current with a sampling rate of f as represented by switch 210. This sampling can be performed on the output from current sensor 46b with standard analog-to-digital (A/D) circuitry included in or separate from processor 100, or the like. In one implementation, f=10,000 Hertz (Hz)=10 kHz so that about 166 samples result for a nominal 60 Hz AC power output frequency. A predefined number of sequential current samples, n, are collected and stored as represented by a delay line buffer 212; where one sample delay store 212a represents the most recent delayed sample and one sample delay store 212b represents that oldest, nth sample. In one form, n=50 consecutive samples are stored in the buffer 212 for the sampling frequency example of f=10 kHz.

Adder 216 sums together the buffered samples in buffer 212 and provides a corresponding output. Switch 220 has an activation frequency of f/n so that it provides the output of adder 216 for every new set of n samples. For the case of (f,n)=(10 kHz, 50), the switching/output frequency for switch 220 is f/n=10,000/50=200 Hz. A predefined number, d, of sums of consecutive n-sample sets from buffer 212 are consecutively stored in delay line buffer 222; where one sample delay store 222a corresponds to the most recently delayed n-sample sum and delay store 222b corresponds to the oldest delayed n-sample sum. It should be appreciated that these n-sample sums each correspond to a different one of a sequence of time segments during which samples were taken. In one nonlimiting form, buffer 222 retains d=10 prior sums of n=50 samples with the initial sample frequency f 10 KHz. It should be appreciated that for the nonlimiting example of (f,n)=(10 kHz, 50), the d prior sums of n-samples represent an output history spanning more than a nominal 60 Hz AC output cycle.

Buffer 222 provides an output of each of the d sums to logical comparator 224 which provides an output of the smallest (minimum) of the d inputs. The comparator 224 minimum sum output is provided to a negative input of difference operator 230. The output of switch 220, the current n-sample sum from adder 216, is provided to a positive input of difference operator 230. Difference operator 230 subtracts the minimum sum output of comparator 224 from the current n-sample sum input from switch 220 to output the difference. This difference between the current n-sample and the minimum of the prior n-sample sums of buffer 222 is provided by operator 230 to operator 232. Operator 232 scales the difference to a desired level and may not be present in other embodiments and/or may be embedded in subsequent operators described as follows.

Operator 234 applies a weight to the scaled value output of operator 232 and compares the weighted value to a threshold. In one embodiment, the determination of this weight is based on the following evaluation. Suppose that an electric power generation system utilizes a scheme of m samples to completely sample one or multiple AC cycles of the output current. Utilizing a consecutive n-sample sum of the rectified (i.e. absolute value) of the sinusoidal current signal:

$$I = I\text{avg} * 1.5708 * \sin(2*pi*t/60 - p),$$

where: Iavg is the average of the rectified output current and p is the phase difference between the output current and output voltage, and n is selected such that m/n=d is an integer.

The minimum corresponding weight Wmin of the all d n-sample sums can be determined by evaluating a large number of discrete current signals with phase delays between zero and 90 degrees. This weight refers to the ratio between an m-sample sum of the rectified current signal (which equals the rectified average of the current signal multiplied by m, i.e. Iavg * m) to the n-sample sum of the rectified current signal. In other words, it refers to the number required to multiply it by an n-sample sum in order to get the m-sample sum (Iavg * m). This number varies depending on the order of the n-sample sum and the phase delay between the output current and output voltage signals.

Logic 200 calculates the sum of n-sample sums and then compares the difference between the calculated n-sample sum and the minimum of the previously calculated d number of n-sample sums to a threshold based on Wmin per the following formula:

$$\text{Threshold} = m * \text{Target}I\text{avg}/W\text{min}$$

where TargetIavg is the desired minimum rectified average value of the output current to be detected.

In one example the following parameters were selected: m=500 samples that spans three 60-Hz cycles using an A/D sampling rate f=10 KHz, n=50 samples and hence d=10 n-sample sums, and Wmin=7.416 that was obtained by analyzing all 50 samples weights for 60-hz sinusoidal currents with phase delays from zero to 90 degrees. For this example, the difference between the minimum of the last ten 50-sample intervals (out of 500 samples which corresponds to three 60 Hz cycles) and the current 50-sample interval of the inverter output current is calculated and compared to the large inverter output current threshold. With these parameters, if the minimum target rectified average of the inverter output current (TargetIavg) is set to 40 Amps to detect loads greater or equal to about 7500 Watts, then the large transient detection threshold is set to 2696872=round(500*1000*40/7.416); where the multiplier 1000 is used to convert the desired target current to milliamps in this example. In other embodiments, some or all of the variable values may differ, the values may be separately calculated/applied, and/or the threshold may be determined in a different manner. For instance, in an alternative approach, Root Mean Squared (RMS) current values could be used instead of averages.

If the threshold is exceeded, logic 200 indicates detection of a type I transient condition, which corresponds to operator 236 in FIG. 6. Referring also to FIG. 5, the type I transient detection corresponds to a true (yes) outcome of the test of conditional 152. Accordingly, routine 150 continues with the execution of operation 154. Operation 154 prepares system 28 for the large load increase by immediately disabling charge mode and enabling the power boost mode at the maximum available power output level for device 70. From operation 154, routine 150 continues with conditional 156. Also, if the test for a type I transient condition is false (no), then conditional 156 is executed directly, bypassing operation 154.

Conditional 156 tests for a type II transient condition. A type II transient condition may exist at the same time as a type I transient condition, and depends on the transient size in relation to capacity of the engine and the charge/boost capacity. Initially, before a full evaluation for a type II transient condition, a threshold test is performed under conditional 156 to determine if the transient mode should be set (TM−true=1). This test is based on whether the cycle to cycle difference in inverter output power is greater than a transient threshold setting. In one nonlimiting example, this threshold is set at 200 Watts.

If the transient mode is set (TM=true), the evaluation under conditional 156 continues. In one form, this evaluation is based on whether the transient size (TS) is greater than the available transient capacity (TC) of the system (TS>TC?). During transient mode (TM=true), TS is determined dynamically by accumulating the cycle to cycle difference in output power, and is set to zero (TS=0) if TM=false (transient mode inactive). For this form, available transient capacity (TC) is the sum of charge capacity (CC), boost capacity (BC) and power unit capacity (PC) less the stored power unit capacity (SPC), such that TC=CC+BC+PC−SPC; where: CC (charge Capacity) is the battery charge power at the beginning of the transient; BC (boost capacity) is a fixed value (such as 3000 Watts in one nonlimiting implementation); PC (power unit capacity) is the current engine power output/capacity; SPC (stored power unit capacity) is the available engine output not yet being utilized at the beginning of the transient.

If the test of the conditional 156 is true (yes) (such as TS>TC), routine 150 proceeds to conditional 158 to test if an exception to the type II transient condition should be made. If there should be no exception made—such that conditional 158 is false (no), then routine 150 continues with operation 160. In operation 160, boost power from device 70 and maximum acceleration of genset 30 are directed to rapidly meet the load demand indicated by the type II transient condition. It should be appreciated that if the type I transient condition had already been determined via conditional 152, then the maximum boost would already be activated by operation 154. To the extent the steady state power level remains greater than the capacity of genset 30 alone for a type II transient condition, it is ordinarily supplemented with boost power from storage device 70.

For conditional 156, transient size is dynamically determined by adding the cycle to cycle difference in output power rather than analyzing inverter output current as for conditional 152. While genset 30 increases rotational speed to its maximum available acceleration to address the transient in operation 160, it should be appreciated that even with maximum acceleration, genset 30 will reach its maximum power generating capacity more slowly than storage device 70. Provided that the target steady state power level is less than the steady state power capacity of both device 70 and genset 30 together (the system power capacity), then the level of power from device 70 decreases as genset speed increases to maintain the required power level. This complimentary decrease/increase of power from device 70/genset 30 continues until the maximum power capacity of genset 30 is reached. For operation 160, the steady state power level typically remains greater than the capacity of genset 30 alone, so supplemental power from storage device 70 is also provided. After operation 160 addresses the transient, routine 150 returns to process 120. Absent any further transients, a steady state power share mode results under operation 138 (steady state power≧genset power capacity); however, should boost power not be required at steady state (steady state power<the genset power capacity), then the power share mode at steady state continues under operation 136. If the test of conditional 158 is false (no), then operation 162 is performed, which is described in greater detail below.

In one nonlimiting example, an exception to the performance of operation 160 is desired even though the test of conditional 156 is true (indicating a type II transient condition) because it is caused by a temporary in-rush current of a certain character commonly associated with the dynamically changing reactive load of a single air conditioner 88 when it starts up. This inrush current exception under conditional 156 is determined by a power factor evaluation, which is further described in connection with FIG. 7.

Figure 7:
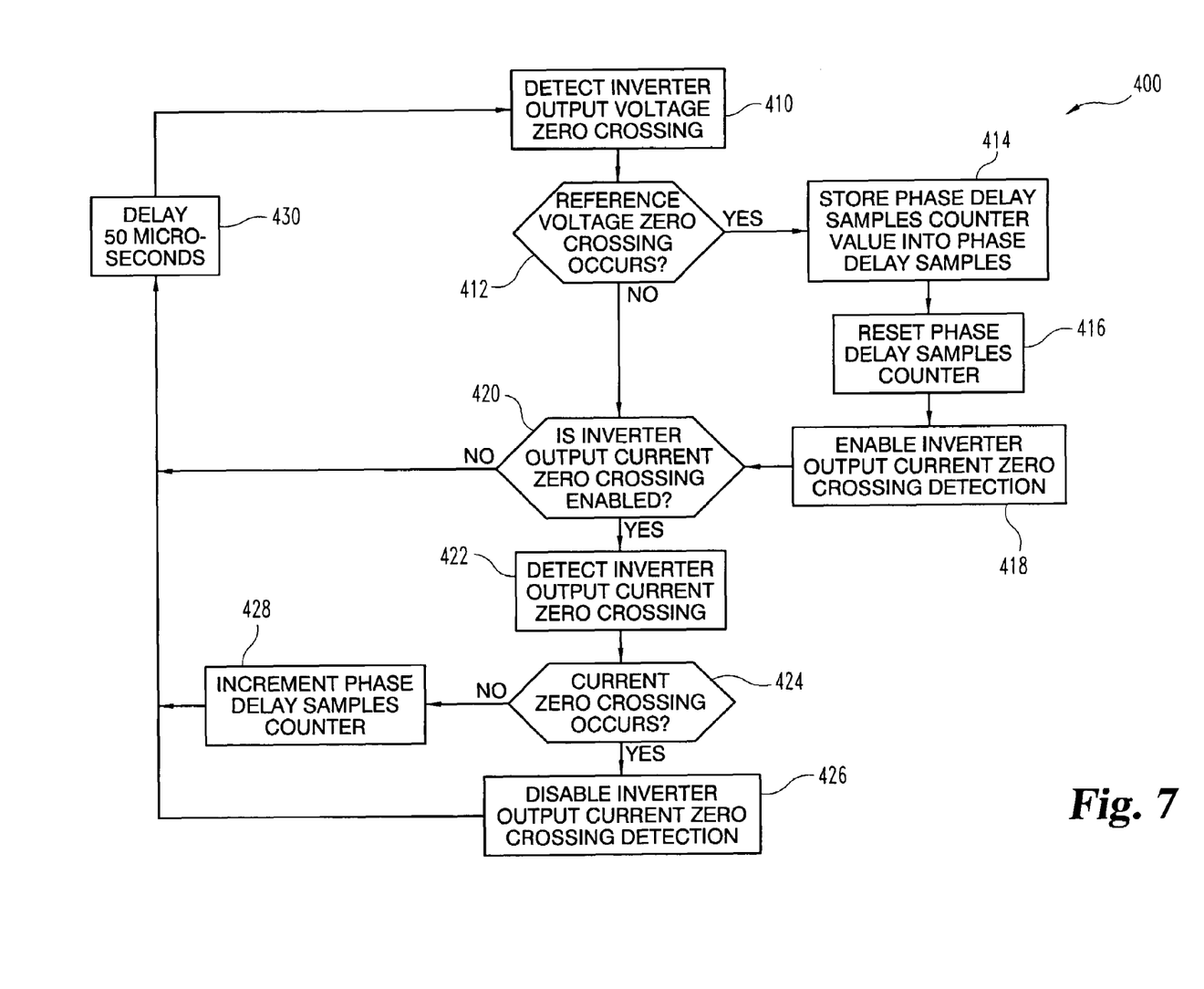
FIG. 7 is a flowchart illustrating one mode for determining power factor.

Referring to FIG. 7, logic 400 is described that can be implemented with processor 100. Logic 400 defines an operational loop that repeats on a periodic basis to store information indicative of the power factor for use in determining the state of conditional 158. It is performed to provide phase delay samples for each 60-Hz cycle. Each repetition of the logic 400 operational loop corresponds to a sample obtained by discrete sampling of the output waveform voltage and current via sensors 46a and 46b, respectively. The technique counts the number of samples between voltage and current upward zero crossing events (negative to positive) to determine a phase difference in terms of sample count. This phase provides a basis for determining phase angle between voltage and current. It should be appreciated that power factor is characterized as the cosine of phase angle—being a unitless measure between zero and unity (0 and 1).

As depicted for a nominal 60 Hz output frequency, the repetition of the logic loop is based on a 50 microsecond (μs) delay operation 430, which corresponds to a sampling rate of 20 kHz (1/20,000 Hz=50 μs). Initially, in operation 410, a zero crossing detection operation 410 is applied to the inverter output voltage. Conditional 412 corresponds to the results of operation 410, indicating if the reference voltage has crossed zero (reversed polarity) or not. If the test of conditional 412 is true (yes), the value of a phase delay sample counter is stored in a "phase delay samples" (PDS) variable in operation 414 and the counter is reset in operation 416. From operation 416, logic 400 continues with operation 418, which enables zero crossing detection of inverter output current. From operation 418, logic 400 proceeds to conditional 420. Conditional 420 tests whether zero crossing of inverter output current is enabled. Conditional 420 is also reached directly from conditional 412 if the test of conditional 412 is false (no).

If the test of conditional 420 is true (yes), operation 422 is encountered in which the inverter output current zero crossing is detected. Conditional 424 corresponds to the result of operation, testing whether the inverter output current crossed zero (reversed polarity). If the test of conditional 424 is true (yes), operation 426 is executed, which disables zero crossing of the output current. Logic 400 proceeds to delay operation 430 from operation 426 to wait for the next sample. If the test of conditional 424 is false (no), operation 428 is performed which increments the phase delay sample counter value that is ultimately stored in operation 414. From operation 428, logic 400 also advances to operation 430. Furthermore, if the test of conditional 420 is false (no)—such that the output current zero crossing is disabled—logic 400 proceeds to operation 430 to delay 50 microseconds to wait for the next sample, returning to repeat operation 410.

Accordingly, for each sample the output voltage upward zero crossing is tested (operation 410/conditional 412). The samples counter value is stored in PDS if a voltage zero crossing is detected (operation 414), the counter is reset to start accumulating the number of phase delay samples (operation 416), and current zero crossing is enabled (operation 418). Once enabled, inverter output current upward zero crossing is tested (operation 422/conditional 424). The phase delay sample counter is incremented (operation 428) for each sample loop until output current zero crossing is detected, at which time the current zero crossing is disabled (operation 426). Accordingly, the next time output voltage zero crossing occurs (operation 410/conditional 412), the stored counter value (operation 414) represents the amount of time that passed between the last voltage zero crossing and the last current zero crossing. In turn, this time segment corresponds to the phase difference and likewise the power factor.

Conditional 158 tests whether the phase delay samples from logic 400 are below a predefined low power factor threshold for two consecutive 60-Hz cycles. If so, then a low power factor condition is flagged that is indicative of a load increase that may be a single air conditioner 88, or the like. If the test of conditional 158 is true, then operation 161 is performed, which temporarily blocks performance of operation 160 over a predefined time period that can be expressed as a number of AC cycles. Such a number may be selected as a measure of the time expected for the inrush current from power-up of a single air conditioner to decrease a given amount, such that it drops below a given threshold. In one nonlimiting example, this blocking occurs for 12 consecutive AC cycle, which approximately corresponds to the time it takes the inrush load current of a single air conditioner load to drop 8 Amps from start-up in one application. To test for a change corresponding to such an inrush current drop, the minimum and maximum output currents over this predetermined cycle span can also be determined in operation 161. The difference between the minimum and maximum output currents is compared to a threshold inrush current drop threshold after the predefined number AC cycles. If this difference is less than the inrush current drop threshold, then the type II transient condition exception is confirmed. If the difference is equal to or greater than the inrush current drop threshold expected for the exception, then the type II transient condition is unblocked for another predefined length of time that may be expressed in terms of AC cycles so that operation 160 can be performed. In one nonlimiting example, the inrush current drop threshold is set to 8 Amperes (Amps) and the number of cycles when the difference is greater than this threshold is 19, providing a total of 31 cycles (12+19 cycles) over which the exception processing of conditional 158 may run its course.

As an override to any blocking of the type II transient condition under conditional 158, a Transient Load Current (TLC) measurement is made and compared to a first threshold applicable to a single AC cycle and a second threshold applicable to any two consecutive AC cycles. TLC is determined dynamically by accumulating the cycle to cycle difference in output current while the system is in transient mode (TM=true). Anytime TLC exceeds the first or second threshold, then a type II transient condition is declared and operation 160 is preformed. In one nonlimiting embodiment, the first, single cycle threshold is set to 80 amps and the second, two consecutive cycle threshold is set to 74 Amps. This override is desired to prevent type II blocking when a reactive or large resistive load is added that initially causes the power factor change observed in connection with logic 400. In one arrangement, it has been found that the start-up of two or more air conditioners could cause this override to desirably occur.

Returning to conditional 156, if its test for a type II transient condition is false, then conditional 164 is encountered. Conditional 164 tests for a type III transient condition that is directed to negative transients (load drops) of a certain character. Specifically, if the load drop is greater than a drop threshold or the DC bus voltage exceeds an upper limit in two consecutive samples at a predetermined sampling rate, then a type II transient condition is declared and operation 166 is performed. In operation 166, the genset speed is reduced at the highest rate possible through maximum deceleration of engine 32. In one nonlimiting implementation, the load drop is greater 4.5 KW and the DC bus voltage upper limit is 350 volts based on a 50 kHz sampling frequency.

If the test of conditional 164 is false (no), then operation 162 is reached. A type IV transient condition is processed in operation 162. In operation 162, for a load increase (positive transient) that does not qualify as a type II, boost power from apparatus 170 is applied and genset speed is increased to meet the target power level subject to a rate of speed change (ramp) limit that results in genset acceleration at less than the maximum available rate of change. For one embodiment, the boost circuitry is arranged to provide as much as twice its continuous rating during transients of a relatively short duration. This duration generally corresponds to the amount of boost desired to support type I and type II transient conditions resulting from reactive loads subject to an initial inrush current and to help engine 32 accelerate faster during large resistive loads. For reactive loads, such as a single air conditioner 88, the duration is long enough to support the initial inrush of a low power factor load (like an air conditioner compressor motor) and allow for the slower ramp-up of generator speed. The resulting load after starting can be less than the genset rating, which permits a slow ramp-up to the genset final speed resulting in a final steady-state mode of genset plus charge.

Operation 162 also addresses those load changes that can be handled by adding the required boost power to the already available power output of genset 30. As the speed of genset 30 increases subject to the ramp limitation, the level of power provided by device 70 decreases to maintain a given power level. From operation 162, routine 150 returns to process 120. If the steady state power level is greater than or equal to the power capacity of genset 30, then the genset 30 runs at maximum capacity/speed and is supplemented by supplemental power from storage device 70, resulting in the steady state power share mode of operation 138. In contrast, if the steady state power level is less than the genset power capacity, then the boost power goes to zero and is disabled as genset 30 reaches a speed corresponding to the steady state power level. Under this circumstance, charge mode is enabled resulting in the steady state power share mode of operation 136.

Also included in operation 162 are power changes with a target post-transient steady-state power demand within the power generating capacity of genset 30. Correspondingly, the level of charging of device 70 in the charge mode is reduced and the genset speed is increased. As the genset share of the power burden increases with its speed, the charge level can increase until the power for electrical loading and charging collectively reach the power generating capacity of genset 30, a maximum desired charge level is reached, or a desired power output of genset 30 results.

For negative transients other than type III, operation 162 is again reached. In this case, operation 162 adjusts boost, charge, and/or engine speed as applicable to address the corresponding load loss. As in the case of increasing engine speed, any decrease in engine speed is subject to the rate of change limit previously described in operation 162.

Typically, the acceleration limit of operation 162 is substantially below the maximum acceleration available for genset 30. In one preferred form, the selected rate of speed change limit is less than or equal to 100 revolutions per minute (rpm) per second (100 rpm/s). In a more preferred form, the selected rate of speed change limit is less than or equal to 50 rpm/s. In an even more preferred form, this limit is less than or equal to 20 rpm/s. In a most preferred form, the limit is approximately 10 rpm/s.

After the charge level and the genset speed stabilize for any of operations 160, 162, or 166, routine 150 returns to process 120. In one nonlimiting approach, the transient mode ends (TM=false=0) when the target power unit capacity reaches a predetermined threshold relative to the current power unit capacity, such as 2% or the like. With the termination of the transient mode, a steady state power share mode results in operation 136 and/or operation 138, depending on the steady state power level relative to the power generating capacity of the engine.

In one implementation, the system continues to update the total system load and update the boost and the target genset speed if additional transient events occur during the gradual acceleration of genset speed. If additional transient events occur the transient may be reclassified and processed accordingly. It should also be noted that in a typical motor coach or marine application the load transients often predominately result in a type IV transient conditions.

Returning to process 120, operations 124, 128, 136, and 138 proceed to conditional 140. Conditional 140 tests whether to continue operation of process 120. If conditional 140 is true (yes), process 120 returns to conditional 122 to re-execute the remaining logic. If conditional 140 is false (no), process 120 halts. It should be recognized that process 120, routine 150, logic 200, and logic 400 are each symbolic logical representations of various dependent and independent functions that could be embodied and/or implemented in a number of different ways. For example, even though presented in an ordered, sequential manner, various conditionals and operations could be reordered, combined, separated, operated in parallel, and/or arranged in a different manner as would occur to one skilled in the art. Such alternatives encompass analog and/or discrete implementations. It should be recognized that in other embodiments different criteria could be used to detect transients and/or different transient responses could be provided. In one further embodiment, limiting acceleration and/or deceleration of genset 30 is not used at all or is subject to removal by operator command through operator input control and display 115. Alternatively or additionally, more or fewer transient types are recognized/detected and/or different criteria define one or more of various transient types. In certain operation modes, charging may be decreased or eliminated to reduce genset speed at steady state. Alternatively or additionally, boost power can be used in lieu of genset 30 at lower steady state power levels under the boost power capacity of storage device 70. This operation could be subject to a monitored reserve power level of storage device 70. Boost power could also be used to reduce power that otherwise could be provided by genset 30 to maintain genset 30 at a lower speed.

Many other embodiments of the present application exist. For example, one or more fuel cell devices, capacitive-based storage devices, and/or a different form of rechargeable electrical energy storage apparatus could be used as an alternative or addition to an electrochemical cell or battery type of storage device 70. Furthermore, one or more fuel cells (including but not limited to a hydrogen/oxygen reactant type) could be used to provide some or all of the power from genset 30 and/or energy storage device 70. Engine 32 can be gasoline, diesel, gaseous, or hybrid fueled; or fueled in a different manner as would occur to those skilled in the art. Further, it should be appreciated that engine 32 can be different than a reciprocating piston, intermittent combustion type, and/or coach engine 26 can be used in lieu of engine 32 to provide mechanical power to generator 34 or to supplement mechanical power provided by engine 32. In still another embodiment, the vehicle carrying system 28 is a marine vessel. In one variation of this embodiment, rotational mechanical power for generator 34 is provided from a propulsion shaft (such as a propeller shaft) with or without engine 32. Alternatively or additionally, generator 34 can be of a different type, including, but not limited to a wound field alternator, or the like with adaptation of circuitry/control to accommodate such different generator type, as desired.

Another embodiment includes more than one rectifier/DC bus/inverter circuit to convert electricity from a variable speed generator to a fixed frequency electric output. For one implementation, the generator is constructed with two isolated three-phase outputs that each supply electricity to a different inverter circuit, but the same engine serves as the prime mover. When multiple rectifier/DC bus/inverter circuits are used in this manner, some or all may include a charge/boost circuitry operating through the corresponding DC bus.

A further example includes: operating an electric power generation system to provide an AC electric power output; evaluating change in electrical loading of the system to distinguish between three or more different transient conditions; in response to a first one of the different transient conditions, performing a first type of adjustment of the system; and in response to a second one of the different transient conditions, performing a second type of adjustment of the system.

Yet another example comprises: operating an electric power generation system to provide an electric power output with a target waveform period; evaluating electrical load change for the system to distinguish a first one of a number of different transient conditions corresponding to two or more of the air conditioners starting from one or more other of the different transient conditions; and adjusting operation of the system based on the different transient conditions.

Still another example includes: operating an electric power generation system to provide an AC electric power output with a target waveform period; evaluating electric current of the AC electric output over each of a number of different time portions of the waveform period to identify a first type of transient condition; evaluating power factor of the AC electric output over a time period greater than the waveform period to identify a second type of transient condition; and adjusting operation of the system based on transient condition type.

A further example comprises: operating an electric power generation system to provide an electric power output with a target waveform period; detecting a first transient condition in response to a load change corresponding to one of a number of air conditioners starting; detecting a second transient condition in response a further load change corresponding to two or more of the air conditioners starting; in response to the first transient condition, performing a first type of adjustment of the system; and in response to a second transient condition, performing a second type of adjustment of the system.

Another example includes: carrying a mobile electric power generation system and multiple air conditioners with a vehicle; operating the mobile electric power generation system to provide an AC electric power output with a target waveform period; performing an evaluation of power factor of the AC electric power output to determine if a power transient results from start-up of only a single one of the air conditioners rather than two or more air conditioners; and adjusting operation of the system in accordance with the evaluation.

Another example includes: operating an electric power generation system including a variable speed generator coupled to a DC bus, an electrical energy storage device coupled to the DC bus, and an inverter coupled to the DC bus; generating an AC electric power output from the inverter by providing at least one of variable AC power from the generator and DC power from the electrical energy storage device; evaluating change in electrical loading of the system to distinguish between three or more different transient conditions; and providing different transient responses of the system in accordance with the different transient conditions.

Yet a further example includes an electric power generation system with a variable speed generator coupled to a DC bus, an electrical energy storage device coupled to the DC bus, and an inverter coupled to the DC bus. This system includes means for generating an AC electric power output from the inverter by providing at least one of variable AC power from the generator and DC power from the electrical energy storage device, means for evaluating change in electrical loading of the system to distinguish between three or more different transient conditions, and means for providing different transient responses of the system in accordance with the different transient conditions.

Still a further example comprises: carrying a mobile electric power generation system and multiple air conditioners with a vehicle that includes a variable speed generator and engine driving the generator; evaluating the electrical load change to distinguish between start-up of two or more of the air conditioners and start-up of a single one of the air conditioners; and providing a transient response of the system to the start-up of the two or more air conditioners and a second transient response of the system to the start-up of the single one of the air conditioners.

In a different example, a mobile electric power generation system and multiple air conditioners are carried with the vehicle. The system includes a variable speed generator and engine driving this generator. Also included are means for evaluating electrical load change to distinguish between start-up of two or more of the air conditioners and start-up of a single one of the air conditioners, and means for providing a first transient response of the system to the start-up of the two or more air conditioners and a second transient response of the system to the start-up of the single one of the air conditioners. The first transient response and the second transient response are different from one another.

Another example includes carrying a mobile electric power generation system with the vehicle that includes a variable speed generator and an engine driving it to provide an electrical AC power output with the target waveform; evaluating electric current of the AC electric power output over each of the number of different time segments of the target waveform to identify a first type of transient condition; evaluating power factor of the AC electric power output over a time period greater than the waveform to identify a second type of transient condition; and adjusting operation of the system based on transient condition type.

Still another example is directed to a system that comprises an engine, a variable speed generator mechanically coupled to the engine, an electrical energy storage device, and power control circuitry. The engine is structured to drive the generator to provide variable frequency AC power. The power control circuitry includes a rectifier to convert the variable frequency AC power to DC power, a DC bus coupled to the rectifier and the electrical energy storage device, an inverter coupled to the DC bus to provide a regulated AC electric power output, and a sensing arrangement to monitor the power output. The circuitry is structured to control electrical energy exchange between the DC bus and the electrical energy storage device and further includes operating logic to evaluate change in electrical loading of the system to distinguish between three or more different transient conditions and generate output signals to adjust at least one of the generator and the electrical energy exchange between the DC bus and the electrical energy storage device.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   operating an electric power generation system including a variable speed generator coupled to a DC bus, an electrical energy storage device coupled to the DC bus, and an inverter coupled to the DC bus;
   generating an AC electric power output from the inverter by providing at least one of variable AC power from the generator and DC power from the electrical energy storage device;
   evaluating change in electrical loading of the system to distinguish between three or more different transient conditions; and
   providing different transient responses of the system in accordance with the different transient conditions.

2. The method of claim 1, wherein a first one of the different transient conditions corresponds to start-up of two or more air conditioners powered by the system.

3. The method of claim 2, wherein a second one of the different transient conditions corresponds to start-up of a single one of the air conditioners.

4. The method of claim 3, wherein a first one of the different transient responses includes increasing rotational speed of the generator at first rate in response to the first one of the different transient conditions and a second one of the different transient response includes increasing the rotational speed of the generator at a second rate in response to the second one of the transient conditions, the second rate being less than the first rate.

5. The method of claim 1, which includes carrying the system with a vehicle.

6. The method of claim 1, which includes charging the electrical energy storage device and changing the charging of the device for one or more of the different transient responses.

7. The method of claim 1, wherein at least one of the different transient responses includes:
   disabling charging of the electrical energy storage device with the generator;
   enabling power boost with the electrical energy storage device to provide the AC electric power output from both the generator and the electrical energy storage device; and
   accelerating the generator at a faster rate than for at least one other of the different transient responses.

8. A method, comprising:
   carrying a mobile electric power generation system and multiple air conditioners with a vehicle, the electric power generation system including a variable speed generator and engine driving the variable speed generator;
   evaluating electrical load change to distinguish between start-up of two or more of the air conditioners and start-up of a single one of the air conditioners; and
   providing a first transient response of the system to the start-up of the two or more air conditioners and a second transient response of the system to the start-up of the single one of the air conditioners, the first transient response and the second transient response being different.

9. The method of claim 8, wherein the first transient response includes increasing rotational speed of the generator at a first rate and the second transient response includes increasing rotational speed of the generator at a second rate less than the first rate.

10. The method of claim 8, wherein the system includes a DC bus coupled to the generator, an electrical energy storage device coupled to the DC bus, and an inverter coupled to the DC bus, and further comprising:
   converting variable frequency AC power from the generator to DC electric power on the DC bus;
   exchanging electrical energy between the DC bus and the electrical energy storage device; and
   providing a regulated AC electrical output to the air conditioners from the inverter.

11. The method of claim 9, wherein the first transient response and the second transient response include the providing of the regulated AC electric power output from both the generator and the electrical energy storage device.

12. The method of claim 8, which includes detecting the start-up of the two or more air conditioners more quickly than the start-up of the single one of the air conditioners.

13. The method of claim 8, which includes charging the electrical energy storage device before detecting the start-up of the two or more air conditioners and the first transient response includes disabling the charging of the electrical energy storage device.

14. The method of claim 8, wherein the second transient response includes:
   increasing boost power from the electrical energy storage device;
   increasing rotational speed of the generator; and
   decreasing the boost power from the electrical energy storage device in response to the generator providing a desired level of AC power.

15. A method, comprising:
   carrying a mobile electric power generation system with a vehicle, the electric power generation system including a variable speed generator and engine driving the variable speed generator to provide an AC electric power output with a target waveform period;
   evaluating electric current of the AC electric power output over each of a number of different time segments of the target waveform period to identify a first type of transient condition;
   evaluating power factor of the AC electric power output over a time period greater than the waveform period to identify a second type of transient condition; and
   adjusting operation of the system based on transient condition type.

16. The method of claim 15, wherein the vehicle carries several air conditioners and the first type of transient condition corresponds to two or more of the air conditioners starting and the adjusting operation of the system includes increasing rotational speed of the generator at a first rate.

17. The method of claim 16, wherein the second type of transient condition corresponds to a single one of the air conditioners starting and the adjusting operation of the system includes increasing rotational speed of the generator at a second rate, the second rate being less than the first rate.

18. The method of claim 16, wherein the first type of transient condition corresponds to a larger initial electrical load change than the second type of transient condition.

19. The method of claim 15, wherein the system includes an electrical energy storage device and the adjusting operation of the system in response to the first type of transient condition includes:
   increasing rotational speed of the generator at a first rate;
   disabling charging of the electrical energy storage device; and
   providing power from the electrical energy storage device to service an electrical load causing the first type of transient condition.

20. The method of claim 15, wherein the system includes an electrical energy storage device and the adjusting operation of the system in response to the second type of transient condition includes:

increasing rotational speed of the generator at a second rate less than the first rate;

increasing power provided from an electrical energy storage device; and decreasing the power from the electrical energy storage device in response to the generator providing a desire level of power.

21. A system, comprising:

an engine;

a variable speed generator mechanically coupled to the engine, the engine being structured to drive the generator to provide variable frequency AC power;

an electrical energy storage device; and power control circuitry including a rectifier to convert the variable frequency AC power to DC power, a DC bus coupled to the rectifier and the electrical energy storage device, an inverter coupled to the DC bus to provide a regulated AC electric power output, and a sensing arrangement to monitor the power output, the circuitry being structured to control electrical energy exchange between the DC bus and the electrical energy storage device, the circuitry further including operating logic to evaluate change in electrical loading of the system to distinguish between three or more different transient conditions and generate output signals to adjust at least one of the generator and the electrical energy exchange between the DC bus and the electrical energy storage device.

22. The system of claim 21, further comprising a vehicle carrying the engine, the variable speed generator, the electrical energy storage device, the power control circuitry, and a number of air conditioners, wherein a first one of the different transient conditions corresponds to start-up of two or more air conditioners powered by the system and a second one of the different transient conditions corresponds to start-up of a single one of the air conditioners.

23. The system of claim 22, wherein the power control circuitry includes means for increasing rotational speed of the generator at first rate in response to the first one of the different transient conditions and increasing the rotational speed of the generator at a second rate in response to the second one of the transient conditions, the second rate being less than the first rate.

24. The system of claim 21, wherein the power control circuitry includes means for charging the electrical energy storage device and means for providing power from the electrical energy storage device.

25. The system of claim 21, wherein the power control circuitry includes a processor executing the operating logic, the operating logic defining a first one of the different transient conditions as a function of electric current of the AC electric power output over each of a number of different time segments of a target waveform period for the AC electric power output and a second one of the different transient conditions as a function of power factor of the AC electric power output over a time period greater than the waveform period to identify a second type of transient condition.

* * * * *